United States Patent
Fujita

(10) Patent No.: US 12,437,433 B2
(45) Date of Patent: Oct. 7, 2025

(54) SKELETON BODY HEIGHT ESTIMATION SYSTEM BASED ON ACQUIRED BODY HEIGHT ATTRIBUTE DATA

(71) Applicant: HONDA MOTOR CO., LTD., Tokyo (JP)

(72) Inventor: Makoto Fujita, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 490 days.

(21) Appl. No.: 17/798,433

(22) PCT Filed: Dec. 28, 2020

(86) PCT No.: PCT/JP2020/049064
§ 371 (c)(1),
(2) Date: Aug. 9, 2022

(87) PCT Pub. No.: WO2021/166459
PCT Pub. Date: Aug. 26, 2021

(65) Prior Publication Data
US 2023/0077027 A1    Mar. 9, 2023

(30) Foreign Application Priority Data
Feb. 19, 2020  (JP) ................. 2020-026465

(51) Int. Cl.
*G06K 9/00*     (2022.01)
*G06T 7/60*     (2017.01)
*G06T 11/60*    (2006.01)

(52) U.S. Cl.
CPC ........... *G06T 7/60* (2013.01); *G06T 11/60* (2013.01); *G06T 2207/30196* (2013.01)

(58) Field of Classification Search
CPC ........ G06T 2207/30196; G06V 40/103; G06V 40/10
See application file for complete search history.

(56) References Cited

U.S. PATENT DOCUMENTS

| 6,038,465 A * | 3/2000 | Melton, Jr. ............ G06V 40/10 |
| | | 600/407 |
| 2011/0052006 A1* | 3/2011 | Gurman ............... G06V 40/103 |
| | | 382/103 |

(Continued)

FOREIGN PATENT DOCUMENTS

| CN | 103565441 A | 2/2014 |
| CN | 105664462 A | 6/2016 |

(Continued)

OTHER PUBLICATIONS

Cardoso, Hugo FV, Luísa Marinho, and John Albanese. "The relationship between cadaver, living and forensic stature: a review of current knowledge and a test using a sample of adult Portuguese males." Forensic Science International 258 (2016): 55-63. (Year: 2016).*

(Continued)

*Primary Examiner* — Gregory A Morse
*Assistant Examiner* — Owais Iqbal Memon
(74) *Attorney, Agent, or Firm* — Rankin, Hill & Clark LLP

(57) ABSTRACT

A length of a target portion is determined such that foot grounding property can be determined during a virtual test ride, and to easily determine a length equal to or approximate to an actual measured length of the target portion without using a sensor configured to directly detect an actual measured value. In an information processing device, a skeleton estimation unit estimates a skeleton of the service user, an information acquisition unit acquires attribute data including a body height of a service user, and a calculation unit calculates a first length equivalent to a first skeleton forming a part of the body height. The first length is obtained by subtracting, from the body height, a specified value and calculates each length of target portions (a leg, an arm, and (Continued)

a torso) of the service user using ratios among the skeletons in the estimated skeleton, and the first length.

10 Claims, 11 Drawing Sheets

(56) References Cited

U.S. PATENT DOCUMENTS

| | | | |
|---|---|---|---|
| 2014/0025346 A1 | | 1/2014 | Uchiyama |
| 2017/0103160 A1 | | 4/2017 | Hynes |
| 2020/0160613 A1 | * | 5/2020 | Han ............... G06V 40/103 |
| 2021/0118170 A1 | * | 4/2021 | Fujii ............... G06T 7/73 |
| 2021/0256747 A1 | * | 8/2021 | Ryu ............... G06T 7/62 |
| 2024/0087353 A1 | * | 3/2024 | Yoshida ............... G06T 7/74 |

FOREIGN PATENT DOCUMENTS

| | | |
|---|---|---|
| CN | 105760832 A | 7/2016 |
| JP | 2018-141717 | 9/2018 |
| JP | 2018-147313 | 9/2018 |
| JP | 2019-175321 A | 10/2019 |
| WO | 2017/168805 A1 | 10/2017 |
| WO | 2017/170264 A1 | 10/2017 |

OTHER PUBLICATIONS

Japanese Office Action dated Jun. 6, 2023 issued in corresponding Japanese application No. 2022-501680; English machine translation included (5 pages).

Extended European Search Report dated Jul. 5, 2023 issued in corresponding European application No. 20 91 9986; English text (8 pages).

En Peng et al : "Acquiring Human Skeleton Proportions from Monocular Images without Posture Estimation", Control, Automation, Robotics and Vision, 2008. ICARCV 2008. 10th International Conference on, IEEE, Piscataway, NJ, USA, Dec. 17, 2008 (Dec. 17, 2008), pp. 2250-2255.

Zhou Xiaojing et al : "Anthropometric body modeling based on orthogonal-view images", International Journal of Industrial Ergonomics, Elsevier, Amsterdam, NL, vol. 53, Nov. 8, 2015 (Nov. 8, 2015) , pp. 27-36.

Indian Office Action dated May 16, 2024 issued in corresponding Indian application No. 202217050573; English translation included (7 pages).

Indonesian Office Action dated Jul. 8, 2024 issued in corresponding Indonesian application No. P00202209520; English translation included (6 pages).

English translation of International Preliminary Report on Patentability dated Sep. 1, 2022 issued in corresponding international application No. PCT/JP2020/049064; 5 pages.

International Search Report, International Application No. PCT/JP2020/049064, Date of mailing: Mar. 2, 2021, 2 pages.

Written Opinion of the International Searching Authority dated Mar. 2, 2021 filed in PCT/JP2020/049064, 3 pages.

Taiwanese Office Action dated Feb. 16, 2022, 4 pages.

Chinese Office Action dated Nov. 8, 2024 issued in corresponding Chinese application No. 202080096759; English translation included (25 pages).

Philippine Office Action dated Aug. 8, 2025 issued in corresponding Philippine patent application No. Jan. 2022/552139; English text (5 pages).

\* cited by examiner

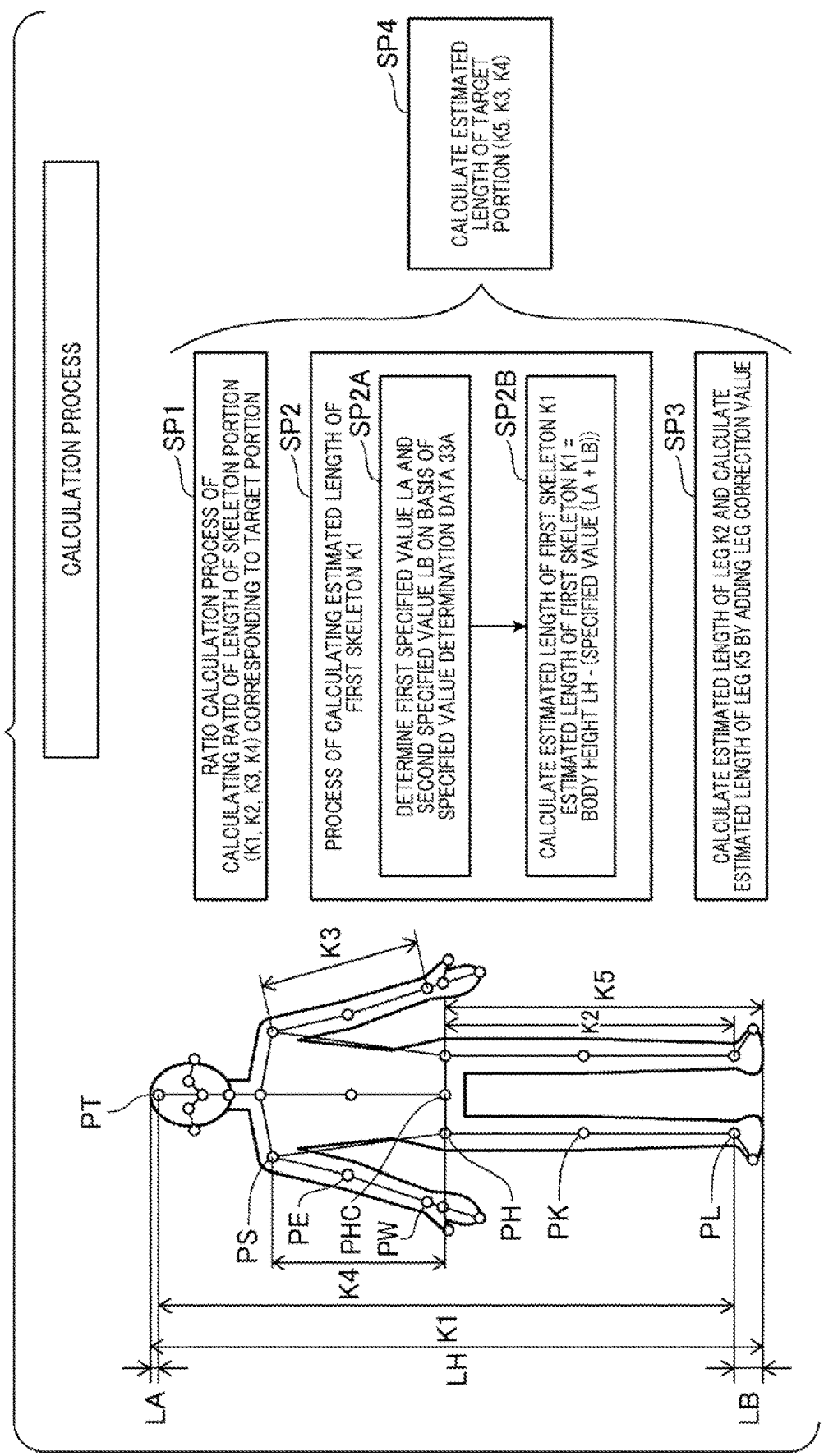

| FIRST SPECIFIED VALUE LA [mm] | SECOND SPECIFIED VALUE LB [mm] |
|---|---|
| XA | YA |

B

| ATTRIBUTE | FIRST SPECIFIED VALUE LA [mm] | SECOND SPECIFIED VALUE LB [mm] |
|---|---|---|
| MALE | XA1 | YA1 |
| FEMALE | XA2 | YA2 |

C

| ATTRIBUTE | FIRST SPECIFIED VALUE LA [mm] | SECOND SPECIFIED VALUE LB [mm] |
|---|---|---|
| MALE IN WHICH BODY HEIGHT SATISFIES FIRST CONDITION | XA1 | YA1 |
| ... | ... | ... |
| MALE IN WHICH BODY HEIGHT SATISFIES nTH CONDITION | XAN | YAN |
| FEMALE IN WHICH BODY HEIGHT SATISFIES FIRST CONDITION | XB1 | YB1 |
| ... | ... | ... |
| FEMALE IN WHICH BODY HEIGHT SATISFIES nTH CONDITION | XBN | YBN |

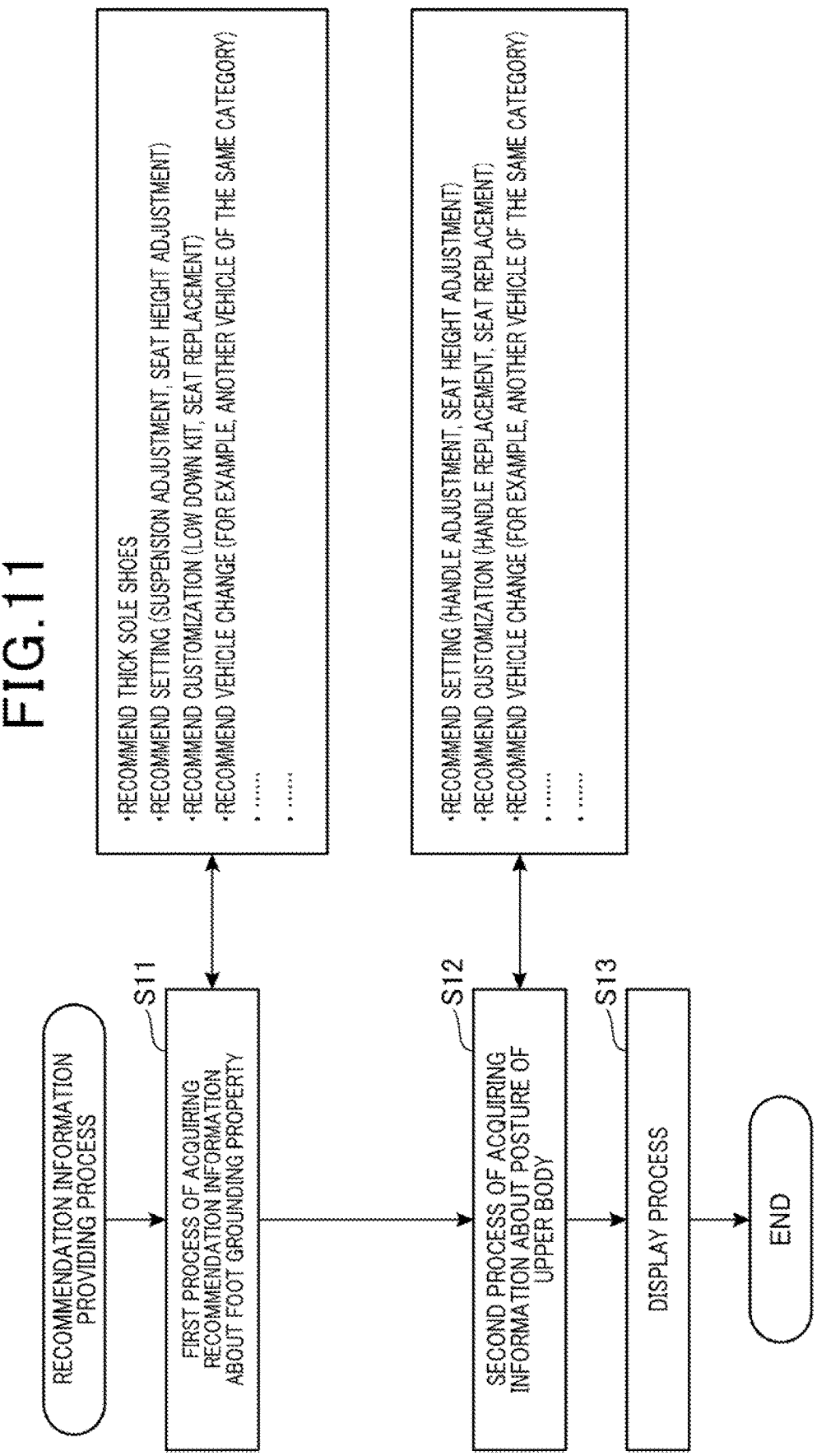

SKELETON BODY HEIGHT ESTIMATION SYSTEM BASED ON ACQUIRED BODY HEIGHT ATTRIBUTE DATA

TECHNICAL FIELD

The present invention relates to an information acquisition device, an information acquisition method, and a control program.

BACKGROUND ART

A customer performs a test ride on a motorcycle of interest, thereby acquiring useful information about the foot grounding property and the like indicating whether the customer can support a vehicle body of the motorcycle by his or her feet, and the like. However, since the customer cannot perform a test ride on the motorcycle of interest in the case where the test ride vehicle is not prepared in a store or the like or in the case where the motorcycle of interest is a racing vehicle or a vehicle before release, the customer cannot confirm the foot grounding property and the like.

In other fields, there has been recently proposed a virtual fitting service that enables a user to virtually try on clothes (for example, see Patent Literature 1). In Patent Literature 1, the waist, hips, and rise of the user are estimated by measuring, with a measurement sensor, a degree of extension of a base material caused by the shape of the body of the user, and the information concerning apparel merchandise matching the size of the user is provided.

When trying a virtual test ride such that a user virtually performs a test ride on a motorcycle, the user desires to determine the foot grounding property and the like. To detect the foot grounding property, it is necessary to determine a length of the entire leg. As a technique of determining the length of the entire leg, a technique is proposed in which a skeleton is generated from a person object in a frame image, and a length of a leg is estimated based on the generated skeleton (see Patent Literature 2).

CITATION LIST

Patent Literature

[Patent Literature 1]
Japanese Patent Laid-Open No. 2018-141717
[Patent Literature 2]
Japanese Patent Laid-Open No. 2018-147313

SUMMARY OF INVENTION

Technical Problem

However, Patent Literature 2 discloses that for example, the length of the entire arm is obtained by determining a right shoulder position from the skeleton and detecting a distance from the right shoulder in the frame image to a mask boundary, and a length of the leg is detected in the similar manner. In the above-described measurement method, only the distance from the position of the skeleton to the mask boundary can be measured, but the length of the entire arm and the length of the entire leg cannot be measured depending on a posture of the person in the frame image. In addition, in Patent literature 2, it is difficult to calculate a value equal to or approximate to the actual measured value of the length of the leg or the like without using a sensor like the measurement sensor in Patent Literature 1 which can directly detect the actual measured value.

The present invention has an object to determine a length of a target portion in a manner such that foot grounding property or the like can be determined during a virtual test ride, or the like, and to easily determine a length equal to or approximate to an actual measured length of the target portion without using a sensor configured to directly detect an actual measured value.

Solution to Problem

This specification includes all the contents of Japanese Patent Application No. 2020-026465 filed on Feb. 19, 2020.

To achieve the object described above, an information acquisition device comprises a skeleton estimation unit (22) configured to estimate a skeleton of a living body, an information acquisition unit (21) configured to acquire attribute data (34A) including a body height of the living body, and a calculation unit (23) configured to calculate a first length equivalent to a first skeleton (K1) forming a part of the body height, the first length being obtained by subtracting a specified value (LA, LB) from the body height, and to calculate a length of a target portion of the living body using ratios among skeletons including the first skeleton (K1) in the estimated skeleton, and the first length.

In the above-described configuration, the first skeleton (K1) may be between a predetermined position (PT) of a head and a predetermined position (PL) of a foot in the skeleton.

In the above-described configuration, the specified value (LA, LB) may be a value obtained by adding a first specified value (LA) equivalent to a length between the predetermined position (PT) of the head and a head top position in the skeleton, and a second specified value (LB) equivalent to a length between a predetermined position (PL) of the foot and a sole position in the skeleton.

In the above-described configuration, the attribute data (34A) further includes at least any of age, sex and a body weight of the living body, and specified value determination data (33A) is provided which is capable of determining the specified value according to the attribute data (34A).

In the above-described configuration, the calculation unit (23) may calculate a length of a skeleton (K2) of a leg of the living body based on ratios among skeletons including the first skeleton (K1), and the first length, and calculate, as a length of an entire leg (K5) of the living body, a length obtained by adding, to the calculation result, a predetermined leg correction value (LB).

In the above-described configuration, the calculation unit (23) may calculate a length of a skeleton (K2) of a leg of the living body based on ratios among skeletons including the first skeleton (K1), and the first length, and calculate, as a length of an entire leg (K5) of the living body, a length obtained by adding, to the calculation result, a predetermined leg correction value (LB).

In the above-described configuration, the skeleton estimation unit (22) may perform a skeleton estimation process of estimating a skeleton of the living body using captured image data showing the living body. In this case, the skeleton estimation process may be a process capable of estimating a skeleton excluding any information of shoes, a hat, clothes, and a hairstyle. The skeleton estimation process may be a process of estimating a skeleton of the living body using a predictive model in which an image of the living body serves as an input and the skeleton of the living body serves as an output.

In the above-described configuration, the target portion includes a leg, and an information providing unit may be provided which acquires information about foot grounding property when the living body is seated on a predetermined seating part based on a calculated length of the leg, and provides the acquired information.

In the above-described configuration, the target portion includes a torso, and an arm, and an information providing unit may be provided which determines information about a posture of an upper body when the living body is seated on a predetermined seating part and grips a predetermined gripping part based on calculated actual measured lengths of the torso and the arm, and provides the determined information.

An information acquisition method comprises causing a skeleton estimation unit (22) to estimate a skeleton of a living body, and causing a calculation unit (23) to calculate a first length equivalent to a length of a first skeleton forming a part of a body height of the living body, the first length being obtained by subtracting a specified value (LA, LB) from the body height included in attribute data (34A), and to calculate a length of a target portion of the living body using ratios among skeletons including the first skeleton in the estimated skeleton, and the first length.

A control program is a program causing a computer to function as a skeleton estimation unit (22) configured to estimate a skeleton of a living body, an information acquisition unit (21) configured to acquire attribute data (34A) including a body height of the living body, and a calculation unit (23) configured to calculate a first length equivalent to a first skeleton (K1) forming a part of the body height, the first length being obtained by subtracting a specified value (LA, LB) from the body height, and to calculate a length of a target portion of the living body using ratios among skeletons including the first skeleton (K1) in the estimated skeleton, and the first length.

Advantageous Effect of Invention

According to the present invention, a length of a target portion in a manner such that foot grounding property or the like can be determined during a virtual test ride, or the like can be determined, and a length equal to or approximate to an actual measured length of the target portion can be easily determined without using a sensor configured to directly detect an actual measured value.

BRIEF DESCRIPTION OF DRAWINGS

FIG. 5 is a diagram illustrating contents of a calculation process together with a human body model.

FIG. 6 is a diagram illustrating a specific example of specified value determination data.

FIG. 11 is a diagram illustrating a recommendation information providing process.

DESCRIPTION OF EMBODIMENT

Hereinafter, an embodiment of the present embodiment will be described with reference to the drawings.

Figure 1:
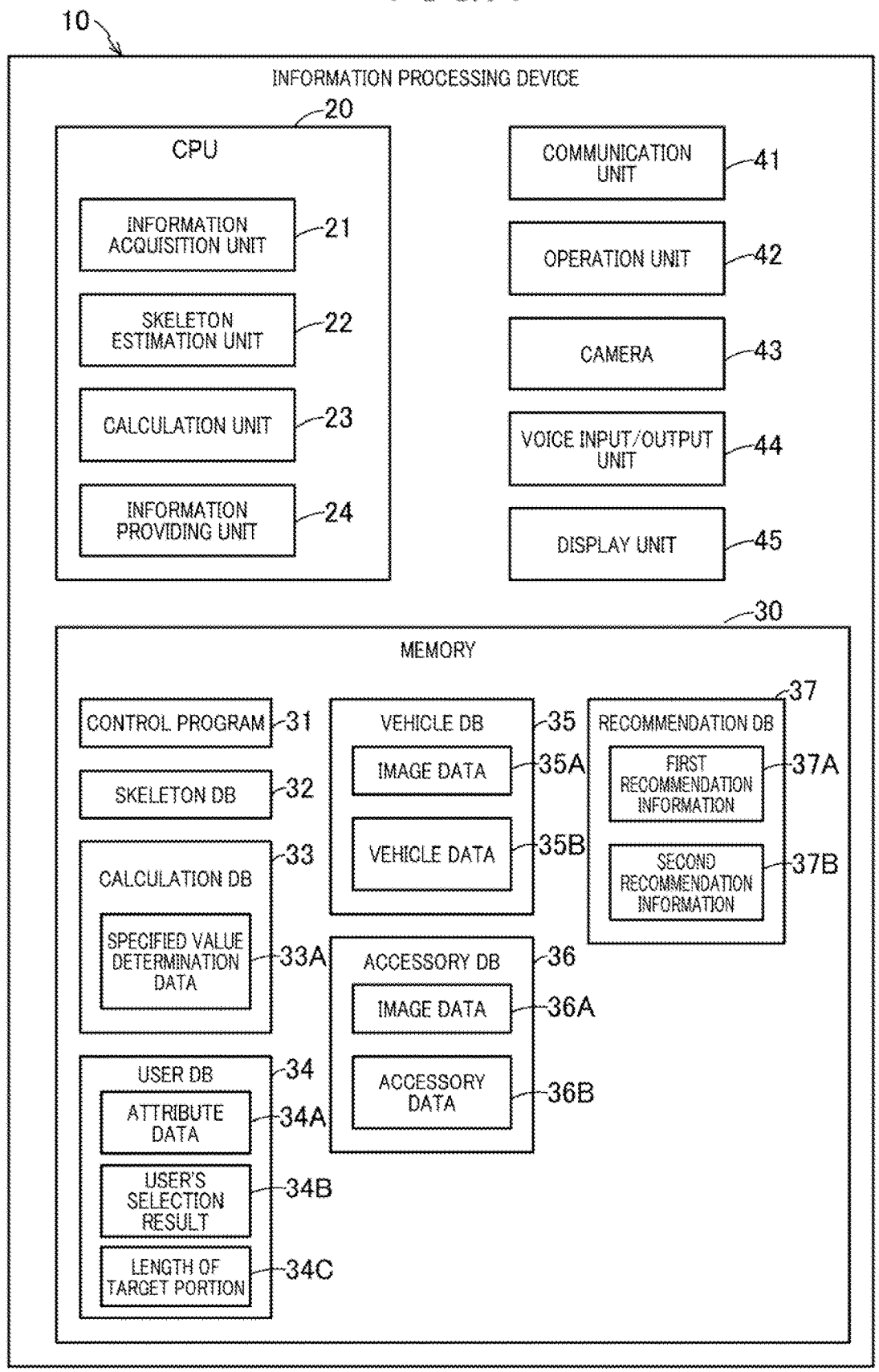
FIG. 1 is a block diagram of an information processing device according to an embodiment of the present invention.

FIG. 1 is a block diagram of an information processing device according to an embodiment of the present invention.

An information processing device 10 is a device which provides a virtual test ride service on a motorcycle (hereinafter, referred to as a "virtual test ride"), and, in the present embodiment, is a smartphone. The information processing device 10 functions as an information acquisition device configured to acquire an actual measured length of a leg or the like of a service user who wishes to perform the virtual test ride, and also functions as an information provision device configured to provide various kinds of information about the virtual test ride.

Note that the information processing device 10 is not limited to a smartphone, and may be another portable device such as a tablet, or a personal computer, or the like.

As illustrated in FIG. 1, the information processing device 10 includes a computer configured to control the information processing device 10 or a central processing unit (CPU) 20 including a control unit, and a memory 30 configured to store a control program 31 or the like for performing the virtual test ride. The CPU 20 executes the control program 31, thereby functioning as an information acquisition unit 21, a skeleton estimation unit 22, a calculation unit 23, and an information providing unit 24, and the like.

The information processing device 10 further includes a communication unit 41, an operation unit 42, a camera 43, a voice input/output unit 44, and a display unit 45. The communication unit 41 performs data communication with various apparatuses connected to the Internet, etc. via a predetermined communication network under the control of the CPU 20. The communication unit 41 can be used to download various programs from a server (not illustrated) through the Internet. For example, the control program 31 for performing the virtual test ride is an application program downloaded from a predetermined server. In addition, the communication unit 41 includes a communication module for short-range radio communication, so that the short-range radio communication becomes possible.

The operation unit 42 includes a touch panel, and a hardware switch, and is configured to accept an operation from a user via these and output an operation result to the CPU 20. A well-known input device is widely applicable to the operation unit 42.

In the present embodiment, description is made on a case where a user of the information processing device 10 basically coincides with the service user. However, an aspect of use in which the user of the information processing device 10 does not coincide with the service user becomes possible. For example, a family member or the like of the service user may operate the information processing device 10 on behalf of the service user.

The camera 43 captures an image of an area surrounding the information processing device 10 and outputs the captured image data under control of the CPU 20. The camera 43 can be used to acquire the captured image data showing the service user. A well-known image capturing device including a camera mounted in the typical smartphone is widely applicable to the camera 43.

The voice input/output unit 44 includes a microphone and a speaker, and is configured to input external voice via the microphone and emit various voices through the speaker under control of the CPU 20. The CPU 20 performs voice recognition of the input external voice, thereby enabling various instructions to be input in voice.

The display unit 45 is a display panel configured to display various kinds of information under control of the CPU 20. A transparent touch panel forming a part of the operation unit 42 is arranged to overlap with the display panel so that a touch operation on a display screen can be detected via the touch panel. A well-known display panel such as a liquid crystal display panel is widely applicable to the display unit 45.

The information acquisition unit 21 acquires the information via the operation unit 42, the communication unit 41, and the like, and stores the acquired various kinds of information in the memory 30. Attribute data 34A indicating attributes of the service user is included in the information. The attribute data 34A is data including the body height, body weight, age, and sex of the service user. The skeleton estimation unit 22 performs a skeleton estimation process of estimating a skeleton of a person (equivalent to the service user) in the captured image data based on the captured image data captured by the camera 43.

Figure 2:
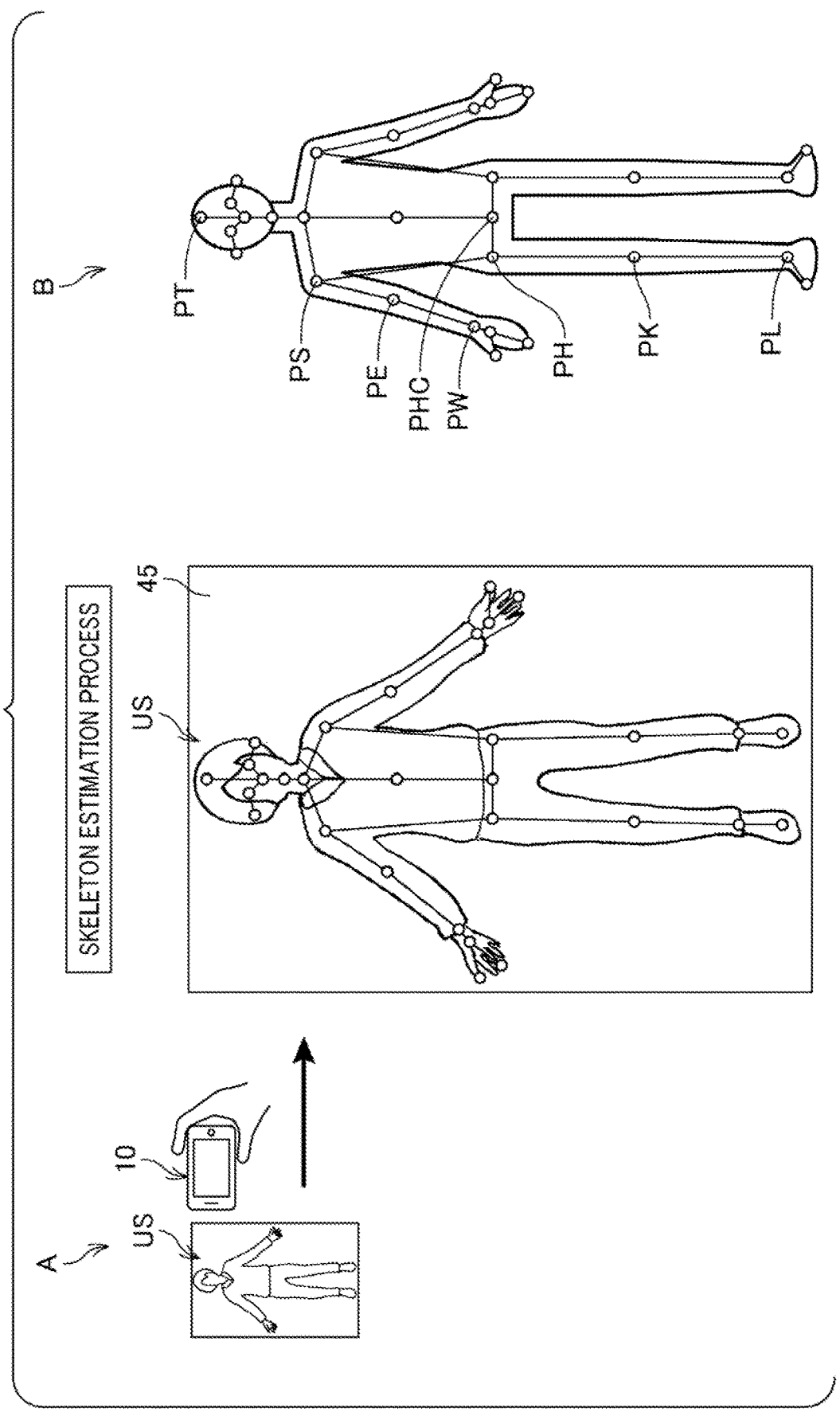
FIG. 2 is a diagram illustrating an outline of a skeleton estimation process.

Here, FIG. 2 illustrates an outline of the skeleton estimation process. Note that in FIG. 2, reference sign US denotes a service user.

As indicated by reference sign A in FIG. 2, in the information processing device 10, captured image data showing the entire body of the service user is captured, and is subjected to the skeleton estimation process to estimate the skeleton of the entire body of the service user. The estimated skeleton is displayed on the display unit 45, and more specifically, is displayed on the display unit 45 by being combined with the captured image in the captured image data.

Note that the service user himself/herself may photograph a so-called selfie using a selca stick (a so-called selfie stick) or a person other than the service user may operate the information processing device 10 to photograph the service user. The captured image data may be a still image or a moving image.

Reference sign B in FIG. 2 is a diagram illustrating the estimated skeleton together with a human body model. In the skeleton estimation process, a plurality of skeleton feature points (portions indicated by circles, in FIG. 2) including joints of the human body are estimated, and bones indicated by line segments connecting each skeleton feature point are estimated. Note that the skeleton estimation process employed in the present embodiment is a well-known process of estimating a skeleton of a human body from an image of the human body using a predictive model based on machine learning of artificial intelligence.

Reference sign PT in a figure indicated by reference sign B in FIG. 2 denotes a skeleton feature point positioned at the approximate center of a forehead of the head, and hereinafter is referred to as a "first position PT." Reference sign PL denotes a skeleton feature point positioned at an ankle of the foot, and hereinafter is referred to as a "second position PL."

Reference sign PH positioned in a lower body denotes a skeleton feature point equivalent to a hip joint, reference sign PHC positioned in the lower body denotes a skeleton feature point equivalent to a center of left and right hip joints, and reference sign PK positioned in the lower body denotes a skeleton feature point equivalent to a knee (or a knee joint). For example, a line segment connecting the hip joint PH and the knee PK can be regarded as a thighbone, and a line segment connecting the knee PK and the second position PL can be regarded as a shinbone.

Reference sign PS positioned in an upper body denotes a skeleton feature point equivalent to a shoulder (or a shoulder joint), and reference sign PE positioned in the upper body denotes a skeleton feature point equivalent to an elbow (or an elbow joint). In addition, reference sign PW denotes a skeleton feature point equivalent to a wrist (or a wrist joint). For example, a line segment connecting the shoulder joint PS and the elbow PE can be regarded as a humerus, and a line segment connecting the elbow PE and the wrist PW can be regarded as the ulna (or radius).

Returning to FIG. 1, the calculation unit 23 performs a calculation process of calculating an actual measured length of the foot or the like using the estimation results of the skeleton, the body height in the attribute data 34A, and the like. The information providing unit 24 performs an information providing process of providing various kinds of information to the service user, using the calculation results and the like of the calculation unit 23.

The information providing process is roughly divided into a first information providing process of providing information about a seated state of a rider and a second information providing process of providing information about a seated state of a rider (a change to thick sole shoes, which will be described later), by displaying predetermined information (the foot grounding property, an inclined angle of the upper body of the rider, and the like, which will be described later) for determining a posture of the rider during a virtual test ride.

The memory 30 stores therein the control program 31, a skeleton database (hereinafter, the "database" is abbreviated as "DB") 32, a calculation DB 33, a user DB 34, a vehicle DB 35, an accessory DB 36, a recommendation DB 37, and the like.

The skeleton DB 32 stores data required for the skeleton estimation process, and specifically stores a predictive model in which an image of the human body serves as an input and a skeleton of the human body serves as an output. The predictive model is information obtained by machine learning or the like which is one of the artificial intelligence technologies. The skeleton estimation unit 22 estimates a skeleton from the image of the human body using the predictive model. Note that the image of the human body may not be necessarily limited to the captured image data captured by the camera 43, and may be, for example, data captured by another camera.

As the artificial intelligence technology used in the skeleton estimation process, image processing technologies such as various kinds of filtering, independent component analyses, support vector machines (SVMs), and contour extraction, machine learning such as pattern recognition (e.g., voice recognition, face recognition, and the like), a natural language process, a knowledge information process, reinforcement learning, a Bayesian network, a self-organizing map (SOM), a neural network, and deep learning (hierarchical learning), and the like may be employed as appropriate.

A smartphone in which an artificial intelligence device is installed is used as the information processing device 10 of the present embodiment. Therefore, the skeleton estimation process can be executed by the single information processing device 10. Note that in the case where a smartphone in which the artificial intelligence device is not installed is used as the information processing device 10, the skeleton estimation process may be executed by using an artificial intelligence device or the like which is included in the server or the like on the communication network.

The calculation DB 33 stores data used in the calculation process, and stores at least specified value determination data 33A. The specified value determination data 33A is data enabling determination of a specified value equivalent to a difference between a body height of a service user which is described in the attribute data 34A and a skeleton of the service user. In the present embodiment, as illustrated in FIG. 5, which will be described later, the specified value determination data 33A is a data for determining a first specified value LA equivalent to a length between the first position PT which is a head position of the skeleton and a head top position, and a second specified value LB equivalent to a length between the second position PL which is a foot position of the skeleton and a sole position.

The user DB 34 stores data related to a service user, and stores the attribute data 34A of the service user, selection results 34B preselected by the service user, data 34C indicating lengths (estimated lengths, which will be described later) of target portions (leg, arm, and torso) calculated by the calculation process which will be described later, and the like.

The vehicle DB 35 stores data related to motorcycles (hereinafter, referred to as "test ride vehicles" as appropriate) on which a virtual test ride is possible. The test ride vehicles include vehicles such as a vehicle before release and a racing vehicle on which an actual test ride is difficult.

The vehicle DB 35 stores, as the data related to the test ride vehicles, image data 35A of a plurality of test ride vehicles, and vehicle data 35B that can determine size and specifications of each test ride vehicle. The image data 35A includes image data that can be displayed in 3D, which makes it possible to display the test ride vehicle in 3D, so that the test ride vehicle can be displayed from various directions such as sideward, forward, or rearward direction.

The image data 35A in the vehicle DB 35 also includes image data for displaying a human body model equivalent to the service user. The image data is preferably data that enables the human body model to be displayed in 3D according to the attribute data 34A of the service user and the lengths (leg, arm, and torso) of the service user. Note that the image data of the test ride vehicle is combined with the image data of the human body model, which makes it possible to display the test ride vehicle in a state where the rider is riding on the test ride vehicle.

The vehicle data 35B has, as the data of the size of the test ride vehicle, size information associated with a riding posture of the rider, and has data that can determine, for example, vehicle body size, a seating position (including a seat height), a handle height, a step position (a footrest place), and the like.

The vehicle data 35B has, as the data of the specifications of the test ride vehicle, specification data associated with a riding posture of the rider in addition to typical specification data including a category of the test ride vehicle (e.g., adventure, authentic, sporty, or the like), displacement, and the like. The specification data associated with a riding posture of the driver includes, for example, data that can determine an amount of compression of the test ride vehicle due to a body weight of the rider, and data related to setting and customization associated with a riding posture of the rider. As the amount of compression of the vehicle body, at least an amount of compression of front and rear suspensions when 1G is applied can be determined. In addition, the information about setting and customization associated with the riding posture includes, for example, the presence or absence of a preload adjustment function of the suspension, and the presence or absence of a seat height adjustment function. The storage contents of the vehicle DB 35 are preferably updated at appropriate timings so that the number and types of test ride vehicles can be changed as appropriate.

The accessory DB 36 stores data related to accessories to be attached when a virtual test ride is performed. The accessories include not only objects such as clothes, shoes, a helmet, and gloves which are worn by the rider but also customized components (including optional components) that are attachable to the test ride vehicle. These accessories include accessories contributing to a change in a riding posture of the rider, and, for example, include at least any one of thick sole shoes, various handles in which a handle position is changeable, a low down kit and a low down seat making it possible to reduce a seat height or the like.

The accessory DB 36 stores, as the data related to the accessories, image data 36A of a plurality of accessories, and accessory data 36B that can determine size and specifications of each accessory. The image data 36A includes image data that can be displayed in 3D, which makes it possible to display the accessory in 3D, so that the accessory can be displayed from various directions such as sideward, frontward, or rearward direction. The storage contents of the accessory DB 36 are updated at appropriate timings so that the number and types of accessories can be changed as appropriate.

The recommendation DB 37 stores recommendation information provided based on the results of the virtual test ride. The recommendation information is roughly divided into first recommendation information 37A about a change in foot grounding property of the rider, and second recommendation information 37B about a change in inclined angle of the upper body. These pieces of information are created based on the information obtained from a manufacturer and/or store of the motorcycle, for example.

For example, the first recommendation information 37A is information including a change to thick sole shoes, adjustment of the seat height (using the suspension preload adjustment function and the seat height adjustment function), and a change to a vehicle with a low seat height in the same category, for example. The second recommendation information 37B is information including adjustment or replacement of the handle, adjustment of the seat height, and a change to a vehicle in the same category that reduces an inclined angle of the upper body, for example.

Figure 3:
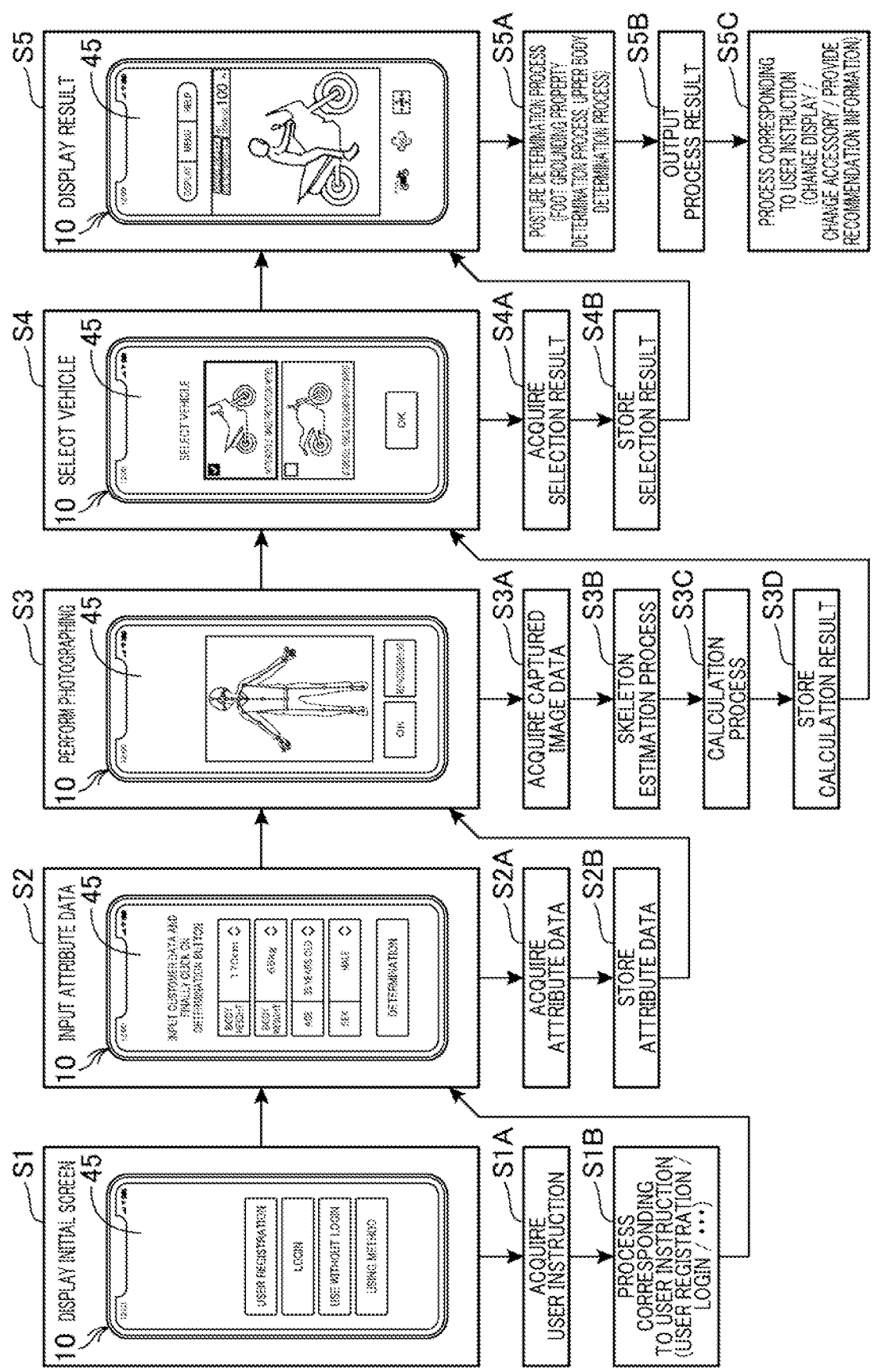
FIG. 3 is a diagram illustrating a flow of a virtual test ride together with an operation of the information processing device.

FIG. 3 is a diagram illustrating a flow of the virtual test ride together with an operation of the information processing device 10.

As illustrated in FIG. 3, the information processing device 10 executes the control program 31 according to an operation of the service user to thereby cause the display unit 45 to display an initial screen (step S1). In step S1, when a user instruction is acquired via the operation unit 42 (step S1A), the CPU 20 performs a process corresponding to the user instruction ("user registration," "login," "use without login," "using method," or the like) (step S1B).

For example, when a region of the "user registration" is subjected to a touch operation, the CPU 20 causes the display unit 45 to display a screen for inputting information required for the user registration, and then, when each piece of information is input via the operation unit 42, the CPU 20 stores the input information in the user DB 34. The information required for the user registration includes information required for the login and the attribute data 34A. The information required for the login includes, for example, a user ID identifying a service user, and a password. When the information required for the login is input, the CPU 20 proceeds to the process of step S2, and causes the display unit 45 to display the input screen of the attribute data 34A.

When in the initial screen, a region of the "login" is subjected to a touch operation, the CPU 20 causes the display unit 45 to display a login screen, and then, when the user ID and the password are input via the operation unit 42, the CPU 20 determines whether the input information agrees with the pre-registered information. If they agree with each other, the CPU 20 proceeds to the process of step S3. Note that, in the case of the login, since the attribute data 34A has already been input in the previous user registration, the process of step S2 is skipped, and the process proceeds to the process of step S3.

When in the initial screen, a region of the "use without login" is subjected to a touch operation, the CPU 20 proceeds to the process of step S2 without requiring the input of the information required for the login, or the like. Note that the "use without login" is equivalent to a case where the user uses the virtual test ride service without making the user registration.

When in the initial screen, a region of the "using method" is subjected to a touch operation, the CPU 20 reads, from the memory 30, data describing the using method of the virtual test ride service or acquires the data through the Internet, to cause the display unit 45 to display the using method. A well-known process is widely applicable to each of the above-described processes.

In step S2, the information processing device 10 displays a screen (an attribute data display screen) for inputting the attribute data 34A including body height, body weight, age, and sex. When in the attribute data display screen, the attribute data 34A is input via the operation unit 42 and a region of the "determination" is subjected to a touch operation, the CPU 20 acquires the input attribute data 34A (step S2A), and stores the attribute data 34A in the memory 30 (step S2B).

When the attribute data 34A is stored, the information processing device 10 causes the CPU 20 to proceed to photographing in step S3. When the login is valid and the attribute data 34A is previously stored, the process proceeds to the photographing in step S3 as described above, which makes it unnecessary to re-input the attribute data 34A after the login.

In step S3, when the information processing device 10 transitions to a state where the photographing can be performed by the camera 43, and acquires the captured image data showing the service user (step S3A), the CPU 20 causes the skeleton estimation unit 22 to perform the skeleton estimation process (step S3B).

In the skeleton estimation process, the skeleton estimation unit 22 uses the predictive model stored in the skeleton DB 32 to recognize the image of the service user in the captured image data, thereby estimating a skeleton of the service user. In the skeleton estimation process of the present embodiment, the artificial intelligence technology is used, which makes it possible to estimate the skeleton without being affected by any of a state where the person in the captured image data is wearing clothes, a state where a part of the person is hidden, a hairstyle of the person, a posture of the person, and the like.

Figure 4:
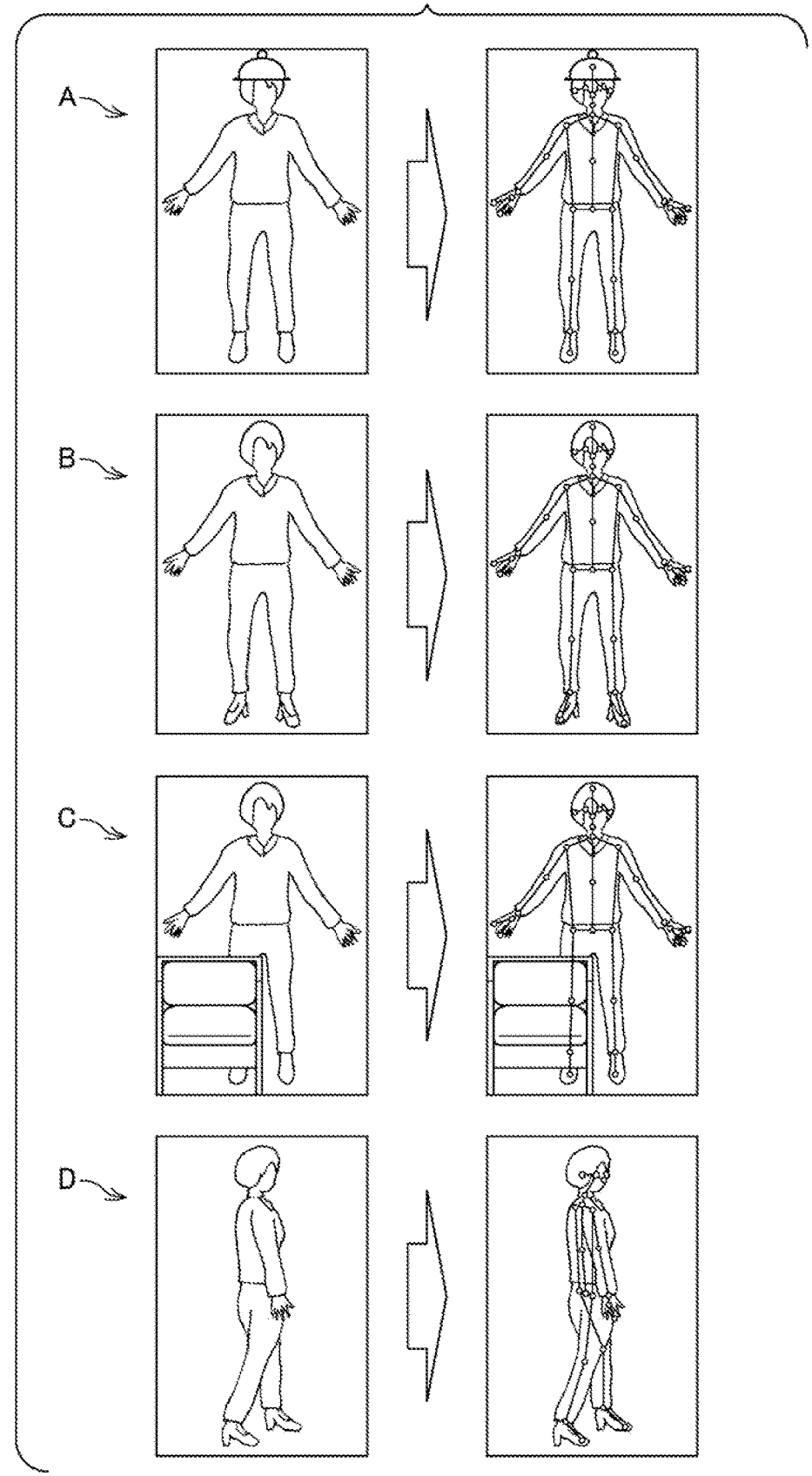
FIG. 4 is a diagram illustrating the skeleton estimation process.

By way of example, reference sign A in FIG. 4 denotes the skeleton estimation result when the person is wearing a hat, reference sign B denotes the skeleton estimation result when the person is wearing high heels, reference sign C denotes the skeleton estimation result when a part of the person is hidden behind the chair, and reference sign D denotes the skeleton estimation result when an image of the person with one knee bent is captured from the obliquely rearward direction. In any case, the systemic skeleton of the person in the captured image data is properly estimated.

Returning to FIG. 3, when the skeleton estimation result is obtained, the information processing device 10 causes the calculation unit 23 to perform a calculation process of calculating lengths of the leg, the arm, and the torso which are preset target portions (step S3C), and stores, in the memory 30, the lengths (estimated lengths, which will be described later) of the target portions which are the calculation results (step S3D).

FIG. 5 illustrates contents of the calculation process together with the human body model.

First, the calculation unit 23 performs a ratio calculation process of calculating a length ratio of a skeleton portion (a leg K2, an arm K3, a torso K4) corresponding to the target portion to a first skeleton K1 which is a representative skeleton forming a part of a body height LH (step SP1). Next, the calculation unit 23 performs an estimated length calculation process of calculating an estimated length of the first skeleton K1 (step SP2). In the ratio calculation process, the ratio of each skeleton is a ratio calculated in a state where the legs and the like are straightened as illustrated in FIG. 5. The first skeleton K1 refers to a skeleton between the first position PT equivalent to an upper skeleton feature point and the second position PL equivalent to a lower skeleton feature point, and an up-down length of the skeleton is approximately equivalent to the body height.

Note that the leg K2 is not the entire leg (hereinafter, referred to a "leg K5"), but is equivalent to a length from the hip joint PH to the second position PL (ankle). That is, the leg K2 is equivalent to a portion obtained by subtracting a length between the second position PL and the sole position (a length equivalent to the second specified value LB) from the leg K5 indicating the entire leg.

As illustrated in FIG. 5, a value obtained by adding the length of the first skeleton K1, the first specified value LA equivalent to the length between the first position PT and the head top position, and the second specified value LB equivalent to the length between the second position PL and the sole position is equivalent to the body height LH. Therefore, the calculation unit 23 determines the first specified value LA and the second specified value LB based on the specified value determination data 33A stored in the calculation DB 33 (step SP2A), and subtracts, from the body height LH included in the attribute data 34A, a value obtained by adding the first specified value LA and the second specified value LB (step SP2B), thereby calculating the estimated length of the first skeleton K1 (step SP).

Next, the calculation unit 23 calculates an estimated length of the leg K2 by multiplying the calculated estimated length of the first skeleton K1 by the ratio (=K2/K1) of the length of the leg K2 with respect to the length of the first skeleton K1, and calculates an estimated length of the leg K5 indicating the entire leg by adding, to the calculated estimated length of the leg K2, the second specified value LB equivalent to a predetermined leg correction value (step SP3).

Subsequently, the calculation unit 23 calculates each estimated length of the arm K3 and the torso K4 by multiplying the calculated actual measured length of the first skeleton K1 by the respective ratios (K3/K1, K4/K1) of each length of the arm K3 and the torso K4 with respect to the length of the first skeleton K1. These make it possible to calculate the length (also referred to as an actual measurement equivalent value) equal to or approximate to each of the actual measured lengths of the leg K5, the arm K3, and the torso K4 which are the target portions (step SP4). Note that the order of the processes of steps SP1 and SP2 may be reversed.

The specified value determination data 33A will be described.

As illustrated in the above-described human body model in FIG. 5, the first specified value LA and the second specified value LB have low proportion of the body height. Therefore, even if errors of the first specified value LA and the second specified value LB are relatively large, an error of the body height falls within a relatively small value range. Accordingly, even when errors of the first specified value LA and the second specified value LB are relatively large, a calculation error of each estimated length of the leg K5, the arm K3, and the torso K4 can easily fall within a small value range. In addition, since the first specified value LA is a separation distance between the forehead center of the head and the head top position and the second specified value LB is a separation distance between the ankle and the sole, individual variations in both of the specified values LA and LB are estimated to be relatively small. Accordingly, even when typical values are used for the first specified value LA and the second specified value LB, a calculation error of each estimated length of the leg K5, the arm K3, and the torso K4 can easily fall within a tolerance range.

FIG. 6 is a diagram illustrating a specific example of the specified value determination data 33A.

Reference sign A in FIG. 6 denotes specified value determination data 33A which is configured in the simplest manner. In the specified value determination data 33A, the first specified value LA and the second specified value LB take single values XA and YA, respectively. For example, the values XA and YA show average values at each portion equivalent to the first specified value LA and the second specified value LB with respect to persons with different body heights, body weights, ages, and sexes.

Reference sign B in FIG. 6 denotes specified value determination data 33A reflecting differences between the sexes. When at least any one of the first specified value LA and the second specified value LB is relatively largely different between the sexes, the specified value determination data 33A is employed, which makes it easy to improve the calculation accuracy.

Reference sign C in FIG. 6 denotes specified value determination data 33A reflecting the body heights. The specified value determination data 33A describes, as the first specified value LA and second specified value LB of a male, respective values XA1 to XAN and YA1 to YAN according to a difference in the body height, and describes, as the first specified value LA and second specified value LB of a female, respective values XB1 to XBN and YB1 to YBN according to a difference in the body height. Employing the specified value determination data 33A makes it easy to improve the calculation accuracy even when at least any one of the first specified value LA and the second specified value LB becomes large due to a difference in the body height.

Note that the specified value determination data 33A is not limited to the above-described examples, and may be data having the first specified value LA and the second specified value which vary according to at least any one of the age, the body weight, and the like, for example.

When each estimated length of the leg K5, the arm K3, and the torso K4 which are the target portions is calculated, the information providing unit 24 causes the display unit 45 to display the calculated estimated length of each target portion.

Figure 7:
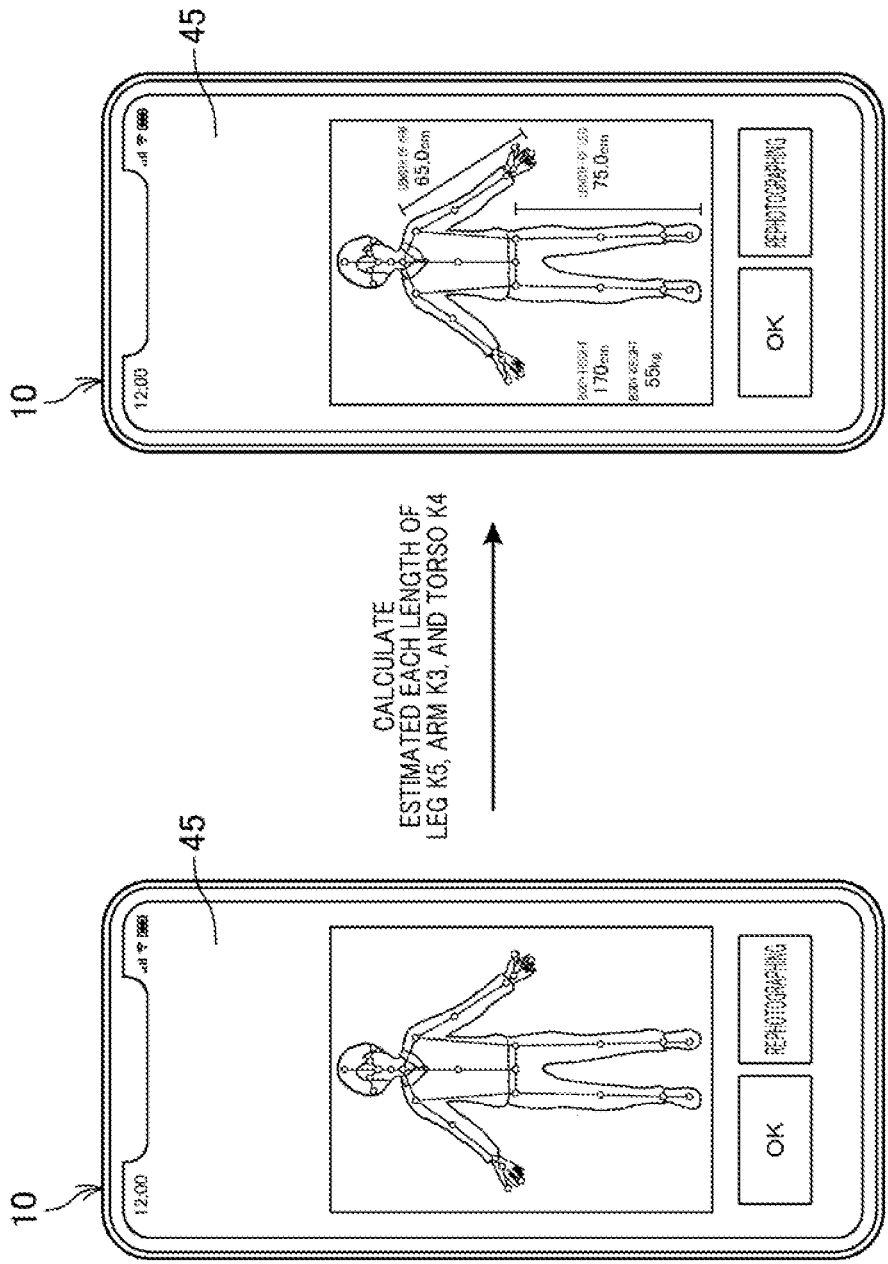
FIG. 7 is a diagram illustrating an example in which an actual measured length of each target portion is displayed.

FIG. 7 is a diagram illustrating an example in which the estimated length of each target portion is displayed.

In FIG. 7, after an image created by combining the skeleton estimation results (skeleton feature points and line segments connecting skeleton feature points) with the displayed image of the captured image data is displayed, each estimated length of the leg K5, the arm K3, and the torso K4 is calculated, and the calculated estimated length of each of the leg K5, the arm K3, and the torso K4 is displayed. Note that FIG. 7 illustrates an example in which the body height and body weight included in the attribute data 34A are also displayed.

As illustrated in FIG. 7, an operation button for instructing rephotographing ("rephotographing" in FIG. 7) and an operation button indicating that the user has accepted the display ("OK" in FIG. 7) are also displayed on the display unit 45. When the "rephotographing" button is touched, the CPU 20 transitions to a state where the photographing can be performed, and executes processes (the skeleton estimation process and the calculation process) for calculating each estimated length of the leg K5, the arm K3, and the torso K4 based on the captured image data newly captured, whereby the skeleton can be estimated again.

When the above-described "OK" button is touched, the information processing device 10 causes the CPU 20 to proceed to vehicle selection in step S4 (see FIG. 3). As illustrated in FIG. 3, in step S4, a selection screen is displayed for selecting a test ride vehicle from selection targets, and a selection result is acquired via the operation unit 42 (step S4A), and the selection result is stored in the memory 30 (step S4B).

Figure 8:
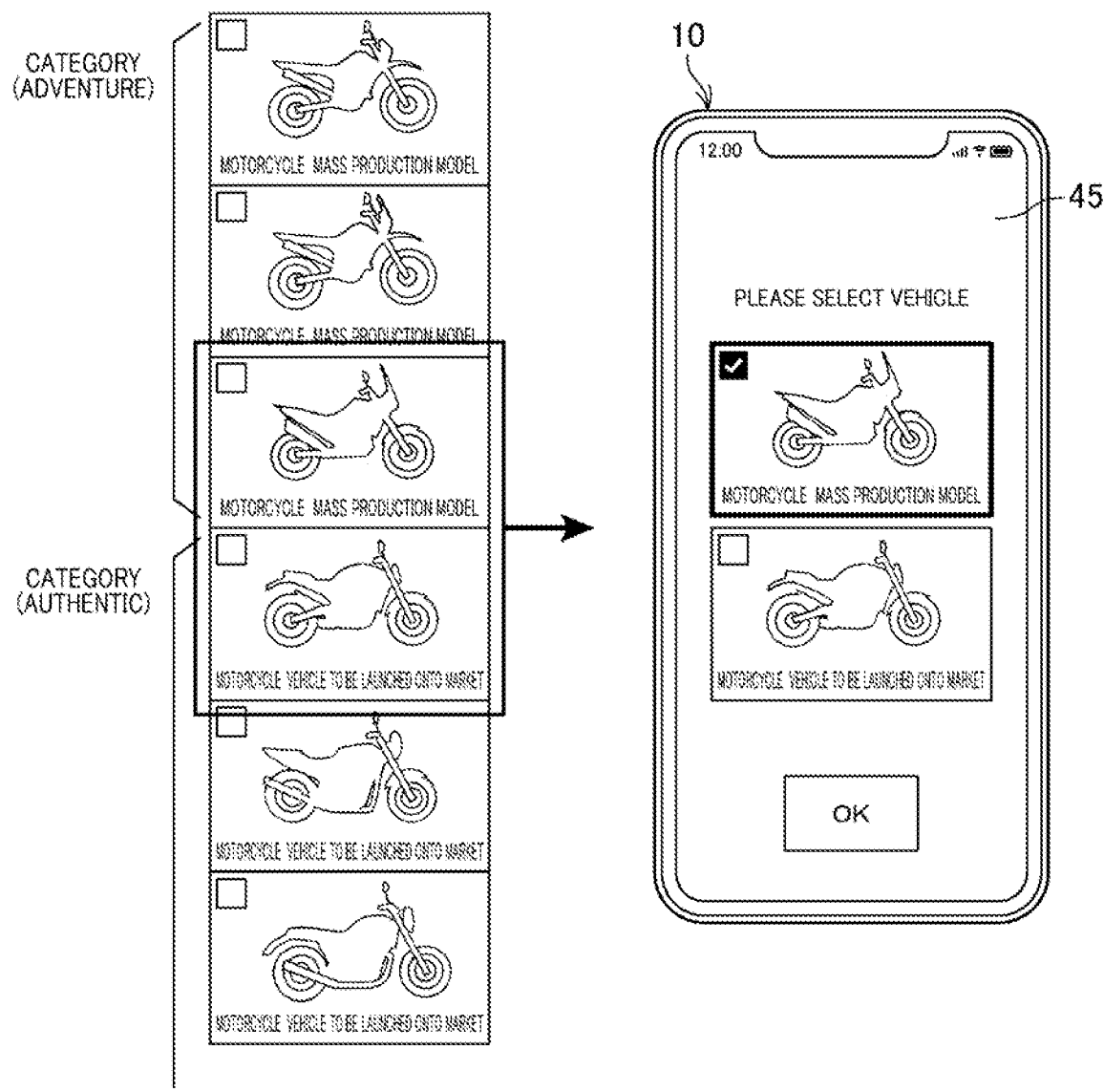
FIG. 8 is a diagram illustrating a method of selecting a test ride vehicle on a selection screen.

FIG. 8 is a diagram illustrating a method of selecting a test ride vehicle on the selection screen.

As illustrated in FIG. 8, the information providing unit 24 displays a plurality of test ride vehicle images in the predetermined order based on the data stored in the vehicle DB 35. The test ride vehicle images to be displayed are changed in response to a predetermined operation (e.g., a flicking operation) of the service user. When the test ride vehicle is selected by a predetermined operation (e.g., a tapping operation), and the "OK" button is touched, the test ride vehicle is determined. Note that FIG. 8 illustrates an example in which a plurality of test vehicles are displayed in the order of the category, but the display order may be changed as appropriate.

When the test ride vehicle is determined, the selection result indicating such an effect is stored in the memory 30, and the process proceeds to result display in step S5.

As illustrated in FIG. 8, each test ride vehicle belongs to any of categories such as adventure and authentic into which the motor cycles are categorized, and in the present embodiment, two or more types of test ride vehicles can be selected for each category. As illustrated in FIG. 8, a mass production model or a vehicle to be launched onto the market are also displayed as the information. The selection criteria, display method, and the like of the test ride vehicles may be changed as appropriate.

Returning to FIG. 3, when the process proceeds to the result display in step S5, the information processing device 10 causes the CPU 20 to perform a posture determination process of determining a riding posture when the service user is seated on a seating part (corresponding to a seat) of the test ride vehicle based on the calculated each estimated length of the target portions (the leg K5, the arm K3, and the torso K4) (step S5A), and output the process result (step S5B). After outputting the process result, the CPU 20 performs a process corresponding to the user instruction (step S5C). The process in step S5C includes a display changing process, an accessory changing process, and a recommendation information providing process, which are described later.

Figure 9:
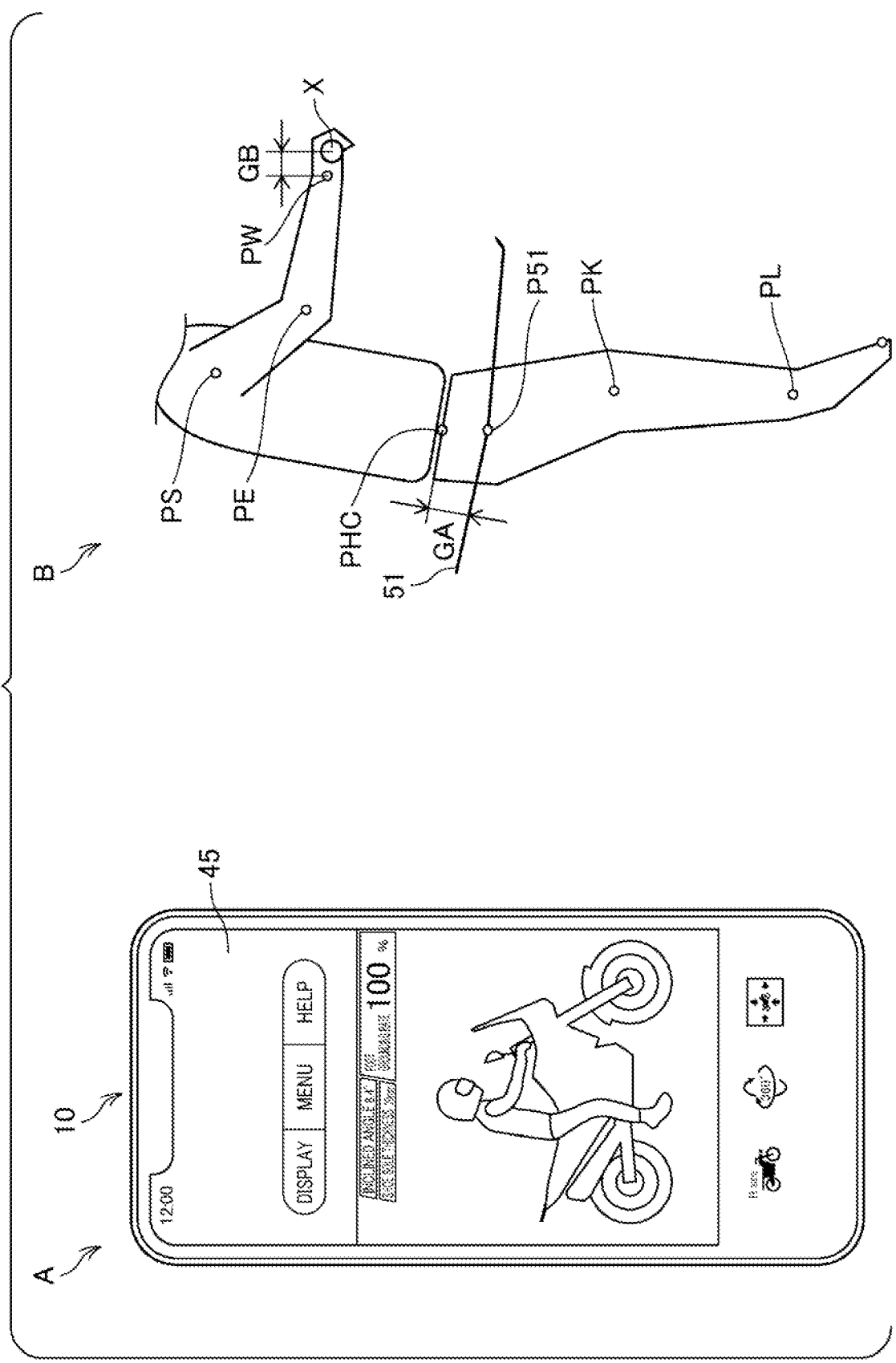
FIG. 9 is a diagram illustrating an example of result display of a posture determination process.

Reference sign A in FIG. 9 denotes an example of a result display of the posture determination process.

The posture determination process includes a foot grounding property determination process of determining the information about the foot grounding property during the virtual test ride ("100%" in the figure) and an upper body determination process of determining the information about the above-described posture of the upper body ("inclined angle 8.4°" in the figure) based on any of the calculated estimated lengths of the target portions (the leg K5, the arm K3, and the torso K4). Therefore, as indicated by reference sign A in FIG. 9, the information processing device 10 causes the information providing unit 24 to display a test ride image showing that a human body model is riding on the test ride vehicle and display the information ("100%") indicating the foot grounding property of the service user, the information ("inclined angle 8.4°") indicating the posture of the upper body, and the information ("20 mm") indicating the shoe sole thickness.

In the foot grounding property determination process, the information providing unit 24 determines a degree to which the foot contacts the ground, based on the estimated length of the leg K5, the size of the test ride vehicle stored in the vehicle DB 35, and the like. More specifically, the information providing unit 24 adds the preset standard shoe sole thickness (e.g., 20 mm) to the estimated length of the leg K5, determines an amount of the shoe sole contacting the ground by comparing the result of the addition and the seat height of the test ride vehicle, and displays the determination result.

In the foot grounding property determination process, the amount of compression of the front and rear suspensions due to the body weight included in the attribute data 34A is determined using the information stored in the vehicle DB 35, the seat height is corrected by the determined amount of compression, and the foot grounding property is determined based on the corrected seat height. This makes it possible to obtain the information about the foot grounding property in the same manner as when the test ride is actually performed.

In the case where it is necessary to obtain the information about the foot grounding property with higher accuracy, the foot grounding property may be determined while reflecting the seat width. On the contrary, in the case where it is not necessary to determine the foot grounding property with high accuracy, a simple method of correcting the seat height by a predetermined value without using the body weight may be employed.

In the upper body determination process, the information providing unit 24 determines the information about the posture of the upper body based on each estimated length of the arm K3 and the torso K4. More specifically, the information providing unit 24 determines an inclined angle of the upper body when the arms K3 grip the handle (a gripping part) of the test ride vehicle and the torso K4 forming a part of the upper body stands from a predetermined position of the seat, based on each estimated length of the arm K3 and the torso K4, the size of the test ride vehicle stored in the vehicle DB 35, and the like, and displays the determination result.

In this way, the information providing unit 24 calculates the foot grounding property and the inclined angle of the upper body, and displays the calculation results. This enables the service user to confirm the foot grounding property and the inclined angle of the upper body. In addition, since the foot grounding property and the like are displayed numerically, it can be easily determined whether the foot grounding property and the like can be satisfactorily used with reference to the numeral values of the foot grounding property and the like, even if the typical best foot grounding property cannot be obtained. In this way, the information providing unit 24 can provide the information indirectly contributing to a change in the seated state of the service user.

Reference sign B in FIG. 9 is a figure related to generation of a test ride image showing that the human body model is riding on the test ride vehicle. As illustrated in the figure, the information providing unit 24 locates the center position PHC of the hip joint preset as a seating reference position at a position shifted by a predetermined offset amount GA with respect to a reference position P51 of a seat 51 forming the seating part of the test ride vehicle. The human body model can be located at a proper position of the seat 51 by setting the offset amount GA to a proper value. Note that the offset amount GA is parameterized to be adjustable, and is stored in a predetermined region of the memory 30.

In addition, the information providing unit 24 can locate the lower body of the human body model at a proper position by locating the knee PK and the second position PL equivalent to the ankle at respective predetermined positions defining a state where the human body model is lowering the leg with respect to the seating reference position PHC. Alternatively, the foot grounding property may be determined by performing such simulation as the above-described foot grounding property determination process.

Furthermore, the information providing unit 24 determines the inclined angle of the upper body of the human body model by locating a wrist PW, a shoulder PS, and an elbow PE with respect to the seating reference position PHC and the position of a handle X of the test ride vehicle. More specifically, the position of the wrist PW is located at a position shifted by a preset offset amount GB with respect to the handle X. The offset amount GB is also parameterized to be adjustable, and is stored in a predetermined region of the memory 30. Alternatively, the inclined angle of the upper body may be determined by performing such simulation as the above-described upper body determination process.

When a test ride image showing that the human body model is riding is generated, each length of the leg, torso, and arm of the human body model is adjusted to the size suitable for the service user and the vehicle body size based on the calculated ratios of the target portions (the leg K5, the arm K3, and the torso K4) and the actual measured values. These make it possible to form the virtual test ride image equivalent to the state where the service user is performing the test ride. This test ride image also functions as the information indirectly contributing to a change in the seated state of the service user.

Figure 10:
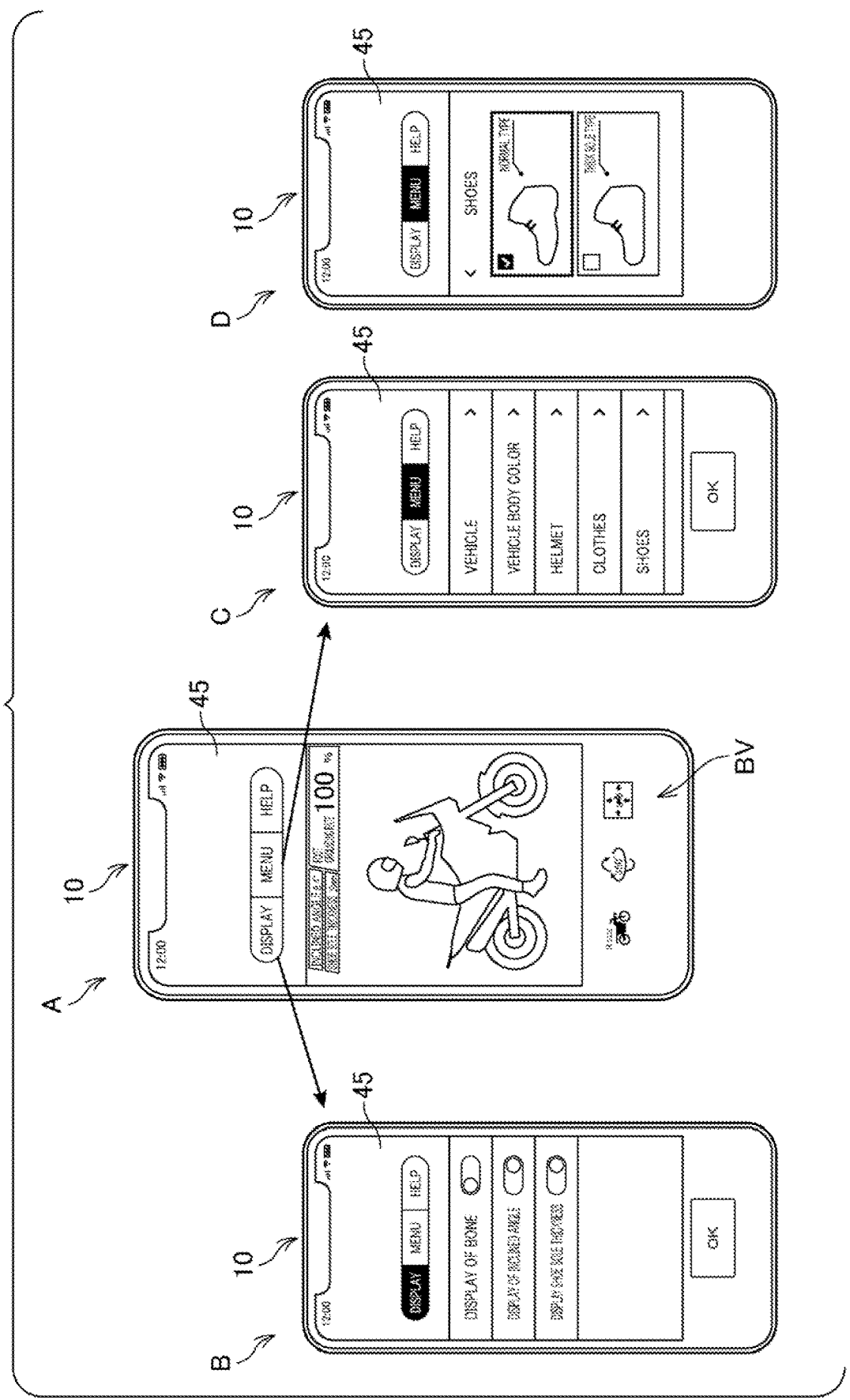
FIG. 10 is a diagram illustrating a display changing process and an accessory changing process.

FIG. 10 is a diagram illustrating the display changing process and the accessory changing process which are included in the process of step S5C. Reference sign A in FIG. 10 denotes an example of a result display of the posture determination process, and an operation button group including "display," "menu," and "help" and an operation button group (indicated by reference sign BV in FIG. 10) for changing an orientation of the virtual test ride image and the like are displayed on the display unit 45 of the information processing device 10.

The operation button group BV has a rotate button for rotating the displayed virtual test ride image in a left-right direction and an up-down direction, a enlarge and reduce button for enlarging and reducing the virtual test ride image, and a return button for returning the state of the virtual test ride image to the predetermined orientation (e.g., a side view) and the original enlargement ratio. These enable the service user to confirm the virtual test ride image at desired orientation and size. Since the display can be returned to the preset orientation and size by operating the return button, the service user can easily confirm a desired portion by rotating and enlarging and reducing the image with respect to the image displayed by operating the return button.

When the "display" button in the figure indicated by reference sign A in FIG. 10 is touched, a skeleton display selection button for selecting the display of the skeleton ("bones"), an angle display selection button for selecting the presence or absence of the display of the inclined angle of the upper body ("forward inclination angle"), a shoe sole display selection button for selecting the present or absence of the display of the shoe sole thickness, and an "OK" button are displayed as indicated by reference sign B in FIG. 10. The display customized to the service user's preference is available by these operation buttons.

When the "menu" button in the figure indicated by reference sign A in FIG. 10 is touched, a screen for accepting the selection of the test ride vehicle ("vehicle"), a vehicle body color, a helmet, clothes, and shoes ("shoes") is displayed as indicated by reference sign C in FIG. 10. The test ride vehicle, the vehicle body color, the helmet, the clothes, and the shoes can be selected for the virtual test ride, in response to predetermined operations of the service user.

Reference sign D in FIG. 10 denotes an example of a screen when selecting the shoes. The information providing unit 24 causes the display unit 45 to display a plurality of shoes based on the data related to the shoes stored in the accessory DB 36, and changes the shoes for the virtual test ride in response to the predetermined operations of the service user (operations of selecting the shoes and touching the "OK" button). When the shoes are changed, in addition to a process of changing the image of shoes in the virtual test ride image, the posture determination process is executed to reflect the thickness of new shoe sole, and the foot grounding property is corrected. For example, when the foot grounding property is insufficient, the value of the foot grounding property can be improved by changing the shoes to the thick sole shoes.

FIG. 11 is a diagram illustrating the recommendation information providing process which is included in the process of step SSC. The recommendation information providing process is executed in response to the predetermined operations of the service user in the display state indicated by reference sign A in FIG. 10, for example.

As illustrated in FIG. 11, the information providing unit 24 performs a first process of acquiring the recommendation information about the foot grounding property (step S11) and a second process of acquiring the recommendation information about the posture of the upper body (step S12), and performs a display process of displaying the information acquired by the above-described processes on the display unit 45 (step S13).

The first process is a process in which the information providing unit 24 extracts the information applicable to the selected test ride vehicle with reference to the first recommendation information 37A stored in the recommendation DB 37. For example, the information providing unit 24 determines one or more of methods of improving the foot grounding property based on the first recommendation information 37A, and determines whether each of the determined methods is applicable to the selected test ride vehicle. The data stored in the vehicle data 35B and the accessory DB 36 is also used to determine whether each of the determined methods is applicable to the selected test ride vehicle.

In this case, as illustrated in FIG. 11, the information providing unit 24 extracts, for example, "recommend thick sole shoes," "recommend setting," "recommend customization," and "recommend vehicle change" based on the first recommendation information 37A. Regarding the "recommend thick sole shoes," the information about the shoes having a thicker sole than that of the currently selected shoes and providing the foot grounding property improved as compared with that of the selected test ride vehicle is extracted from the accessory DB 36. The extracted shoes preferably provide the foot grounding property falling within a predetermined satisfactory range. The satisfactory range refers to a preset range or a range arbitrarily set by the service user or the like.

Regarding the "recommend setting" and "recommend customization," from the vehicle data 35B of the test ride vehicles, the information about the setting for improving the foot grounding property (e.g., the suspension preload adjustment function and the seat height adjustment function) is extracted, and the information about the customization for improving the foot grounding property (e.g., the low down kit and the low down seat) is extracted.

Furthermore, regarding the "recommend vehicle change," another test ride vehicle providing the foot grounding property improved as compared with that of the selected test ride vehicle is extracted from the test ride vehicles of the same category as the selected test ride vehicle in the vehicle data 35B. The reason the test ride vehicle of the same category is extracted is because the possibility that another vehicle customized to the service user's preference can be extracted increases. However, the present invention is not limited to an aspect in which another vehicle of the same category is extracted, and another vehicle of the same category and with close displacement may be extracted. The extraction reference of another vehicle can be changed as appropriate, and another vehicle with close displacement may be extracted without limiting the category.

In the first process (step S11), an example has been illustrated in which the information for improving the foot grounding property is extracted, but is not limited thereto, and it is only required that various types of information about a change in the foot grounding property be extracted as appropriate.

The second process in step S12 is a process in which the information providing unit 24 extracts the information applicable to the selected test ride vehicle with reference to the second recommendation information 37B stored in the recommendation DB 37. For example, the information providing unit 24 determines one or more of methods of improving the posture of the upper body based on the second recommendation information 37B, and determines whether each of the determined methods is applicable to the selected test ride vehicle. The data stored in the vehicle data 35B and the accessory DB 36 is also preferably used to determine whether each of the determined methods is applicable to the selected test ride vehicle.

In this case, as illustrated in FIG. 11, the information providing unit 24 extracts, for example, "recommend setting," "recommend customization," and "recommend vehicle change" based on the second recommendation information 37B. Regarding the "recommend setting," the information (e.g., the handle adjustment function of adjusting the handle to a position nearer than the body or a higher position, and the adjustment function of lowering the seat height) about the setting for reducing the inclined angle of the upper body (=the upper body is made closer to an upright state) is extracted from the vehicle data 35B of the test ride vehicles. Regarding the "recommend customization," the information (e.g., the handle replacement and the seat replacement) about the customization to make the upper body closer to an upright state is extracted from the vehicle data 35B of the test ride vehicles. Furthermore, regarding the "recommend vehicle change," another test ride vehicle in which the upper body can be made closer to an upright state than the selected test ride vehicle is extracted from the test ride vehicles of the same category as the selected test ride vehicle in the vehicle data 35B. The extraction reference of another vehicle can be changed as appropriate.

In the second process (step S12), an example has been illustrated in which the information for bringing the upper body into the upright state is extracted, but the second process is not limited thereto, information for bringing the upper body into a forwardly inclined state may be extracted, and it is only required that various types of information about a change in the posture of the upper body be extracted as appropriate.

The information providing unit 24 displays these extraction results, thereby providing, to the service user, the information about the foot grounding property of the selected test ride vehicle and the change in the posture of the upper body. Note that, in FIG. 11, an example is illustrated in which the first process and the second process are performed as one set, but it may be determined whether the first process related to the foot grounding property is executed and whether the second process related to the posture of the upper body is executed, according to the results of the posture determination process. For example, when the detected foot grounding property does not fall within an appropriate range determined by the service user or a predetermined appropriate range, the information providing unit 24 may execute the first process. In addition, when the detected inclined angle of the upper body does not fall within an appropriate range determined by the service user or a predetermined appropriate range, the information providing unit 24 may execute the second process.

As described above, in the information processing device 10, the skeleton estimation unit 22 estimates a skeleton of the service user, the information acquisition unit 21 acquires the attribute data 34A including a body height of the service user, and the calculation unit 23 calculates a first length equivalent to the first skeleton K1 forming a part of the body height, the first length being obtained by subtracting, from the body height, a specified value (the first specified value LA and the second specified value LB) and calculates each length of target portions (a leg, an arm, and a torso) of the service user using the ratios among the skeletons K1 to K4 in the estimated skeleton, and the first length. In this way, each length of the target portions can be determined using the estimated skeleton and the body height. Accordingly, each actual measured length of the target portions can be determined so that the foot grounding property and the like during the virtual test ride can be determined. The length (actual measurement equivalent value) equal to or approximate to each of the actual measured lengths of the target portions can be easily determined without using a sensor which can directly detect the actual measured value.

The first skeleton K1 is between the first position PT of the head and the second position PL of the foot in the estimated skeleton. This makes it possible to set a specified value (the first specified value LA and the second specified value LB) equivalent to a difference between the body height and the length of the first skeleton K1 to a relatively small value, and reduce the influence of an error of the specified value, if any, on the calculation accuracy of each length of the target portions.

The first specified value LA is a value equivalent to a length between the first position PT of the head and the head top position in the estimated skeleton, and the second specified value LB is a value equivalent to a length between a predetermined position (PL) of the foot and a sole position in the skeleton. This makes it possible to easily secure the calculation accuracy of each length of the target portions even when one type of value as illustrated in FIG. 6 is used for each of the first specified value LA and the second specified value LB. Furthermore, as indicated by reference signs B and C in FIG. 6, the specified value determination data 33A which can determine the first specified values LA and the second specified values LB according to the attribute data 34A can be used, thereby improving the accuracy of these specified values LA and LB and improving the calculation accuracy of each length of the target portions.

The calculation unit 23 calculates the length of the leg K2 equivalent to the skeleton of the leg based on the ratios among the skeletons K1 to K4 including the first skeleton K1 and the above-described first length, and calculates, as the length of the leg K5 indicating the entire leg, the length obtained by adding, to the calculation result, the second specified value LB equivalent to the leg correction value. In this way, the actual measurement equivalent value of the entire leg can be easily calculated.

In the present embodiment, as the length of the arm, an example has been illustrated in which the length (the length of the arm K3 illustrated in FIG. 5) from the shoulder PS to the wrist PW in the skeleton is calculated, but the present invention is not limited thereto. For example, as indicated by reference sign B in FIG. 9, the length of the arm affecting the riding posture is a length from the handle X to the shoulder PS. Therefore, the calculation unit 23 may calculate the length of the entire arm affecting the riding posture by adding, to the calculated actual measured length of the arm K3, the arm correction value (a value of a typical actual measured value corresponding to the above-described offset amount GB) equivalent to the length between the wrist PW and the handle X.

For example, the arm correction value may be an average value of the actual measured values corresponding to the above-described offset amount GB or may vary depending on any of the sex, the body height, and the like.

Since the skeleton estimation unit 22 performs the skeleton estimation process of estimating the skeleton of the service user using the captured image data, the skeleton can be estimated without requiring a special device and without limiting the place and timing. Since the skeleton estimation unit 22 estimates the skeleton using a typical configuration included in the smartphone, the skeleton can be relatively easily estimated even using various devices having a configuration similar to the configuration included in the smartphone. In addition, since the skeleton estimation process is a process capable of estimating the skeleton excluding any information of shoes, a hat, clothes, and a hairstyle, the skeleton of person of any style can be estimated. These make it possible to perform the virtual test ride without limiting the place, the timing, and the style of the service user.

Since the skeleton estimation process is a process of estimating the skeleton of the human body using a predictive model in which an image of the human body serves as an input and a skeleton of the human body serves as an output, the skeleton can be easily estimated with high accuracy using the predictive model based on machine learning of artificial intelligence.

In the information processing device 10 of the present embodiment, the skeleton estimation unit 22 estimates a skeleton of the service user, the information acquisition unit 21 acquires the attribute data 34A including a body height of the service user, the calculation unit 23 calculates each length of the target portions of the service user based on the skeleton and the body height, and the information providing unit 24 provides predetermined information about a posture of the service user (the foot grounding property, the inclined angle of the upper body, the information for improving the posture, and the like) based on each length of the target portions and the information about the test ride vehicle serving as a seating target. Thus, the useful information can be provided for the virtual test ride, which easily leads to the improvement of the purchasing motivation of a purchase applicant. In addition, the useful information about the test ride can be provided for the vehicles on which an actual test ride is impossible, and is advantageous to improve customer satisfaction.

Since the information provided by the information providing unit 24 includes the information about the foot grounding property of the service user, the service user can obtain the information about the foot grounding property without performing the actual test ride.

Since the information acquisition unit 21 corrects the seat height of the test ride vehicle based on the body weight of the service user included in the attribute data 34A and acquires the information about the foot grounding property based on the corrected seat height, the information about the foot grounding property can be acquired with high accuracy.

Since the information provided by the information providing unit 24 includes the recommendation information about the foot grounding property, the information useful for the service users can be obtained, in particular, the service users being less knowledgeable and less experienced about the motorcycles. The recommendation information can maintain or improve the purchasing motivation and interests of the customers.

Since the information provided by the information providing unit 24 includes the information about the posture of the upper body when the service user is seated on the seat of the test ride vehicle and grips the handle of the test ride vehicle, the service user can obtain the information about the posture of the upper body without performing the actual test ride.

Since the recommendation information includes the information about the setting and customization of the test ride vehicle, the information useful for the service users can be obtained, in particular, the service users being unfamiliar with the setting and customization. The information to be provided is not limited to the information about both of setting and customization, and the information about any one of setting and customization may be provided. It may be configured to provide only the information about at least any one of the foot grounding property and the inclined angle of the upper body, without providing the recommendation information.

The information processing device 10 accepts the selection of the test ride vehicle from a plurality of motorcycles belonging to the same or different categories. The information providing unit 24 includes, in the predetermined information about the posture when the service user is seated on the selected test ride vehicle, the information about the other motorcycles of the same category in which the posture is in a more upright state than the selected test ride vehicle. This makes it possible to easily provide the information about another motorcycle which can be suited to the preference of the service user and can improve the riding posture.

The above-described embodiment describes an aspect of the present invention, and the present invention is not limited to the above-described embodiment.

In the above-described embodiment, there has been described the case where the value indicating the foot grounding property and the inclined angle of the upper body are calculated, but the present invention is not limited thereto, and, for example, the knee bending angle when the service user is riding on the test ride vehicle may be calculated. For example, the information providing unit 24 can calculate the knee bending angle by using the calculated leg length, the ratio of thighbone (equivalent to a line segment connecting the hip joint PH and the knee PK in the figure indicated by reference sign A in FIG. 5) and the shinbone (equivalent to a line segment connecting the knee PK and the second position PL) in the estimated skeleton, and the size of the test ride vehicle (a step position, a seat position, and the like). The useful information about the riding posture can be provided by displaying the calculated knee bending angle.

When the knee bending angle is calculated, the information providing unit 24 may be configured to execute a process of acquiring the recommendation information about the knee bending angle, and cause the display unit 45 to display the acquired information. For example, it is only required that third recommendation information about a change in the knee bending angle be stored in the recommendation DB 37, and the information providing unit 24 provide the recommendation information for changing the knee bending angle, using at least the third recommendation information. For example, the third recommendation information is information contributing to the improvement of the knee bending angle, and more specifically information about the position adjustment and replacement of the step and a change in the seat height which are made to increase the knee bending angle.

Without limitation to the knee bending angle, the bending angle of any portion (e.g., an ankle) of the foot may be calculated, and the recommendation information about the bending angle of the portion may be provided.

In the above-described embodiment, an example has been illustrated in which the length (first length) of the first skeleton used for calculation of each length of the target portions is a length between the first position PT and the second position PL among a plurality of skeleton feature points, but the present invention is not limited thereto.

For example, the length (first length) of the first skeleton may be changed to a length between another skeleton feature point (as an example, a skeleton feature point at a nose or chin) around the first position PT and another skeleton feature point (as an example, a skeleton feature point at a toe) around the second position PL. In this case, the specified values are changed according to the change in the first skeleton, which makes it possible to properly calculate the length of the first skeleton and each length of the target portions.

The number of types of specified values to be set is not limited to two types of the first specified value LA and the second specified value LB. For example, one type of specified value (as an example, one having a relatively longer distance of the first specified value LA and the second specified value LB) may be set within a range possible to obtain sufficient accuracy for determination of the foot grounding property and the like.

In the above-described embodiment, an example has been illustrated in which the virtual test ride service of the motorcycle is provided, but the present invention is not limited to the motorcycle, and may be applied to an arbitrary seating object. For example, the present invention may be applied to a saddle-riding vehicle including a bicycle, a scooter vehicle, and a three-wheeled vehicle and four-wheeled vehicle such as ATVs, various vehicles not limited except a saddle-riding vehicle, or objects such as chairs and sofas other than vehicles. In the above-described embodiment, description has been made in which a living body to be seated on the seating target is a human, but the living body may be non-human beings such as animals, for example.

There has been described the case where the present invention is applied to the information processing device 10 illustrated in FIG. 1 and the like, the information acquisition method of acquiring each length of the target portions, and the control program 31, but the present invention need not be limited to this aspect. For example, each component of the information processing device 10 may be arbitrarily implemented by collaboration between hardware and software and may be changed as appropriate. Furthermore, the processes corresponding to each step of each flowchart may be divided or merged.

The control program 31 is widely applicable to a program that is downloaded from a distribution server, etc. over a communication network via an electric communication line and is executable by any computer, or to a program that is stored in a recording medium such as a magnetic recording medium, an optical recording medium, or a semiconductor recording medium and is read from the recording medium and executed by any computer.

REFERENCE SIGNS LIST

10 Information processing device (information acquisition device, information provision device)
20 CPU
21 Information acquisition unit
22 Skeleton estimation unit
23 Calculation unit
24 Information providing unit
30 Memory
31 Control program
37A First recommendation information
37B Second recommendation information
33 Calculation DB
33A Specified value determination data
34 User DB
34A Attribute data
35 Vehicle DB
36 Device DB
37 Recommendation DB
PT First position (predetermined position of head)
PL Second position (predetermined position of foot)
LA First specified value
LB Second specified value (leg correction value)
K1 First skeleton
K2, K5 Leg
K3 Arm
K4 Torso
GA, GB Offset amount

The invention claimed is:

1. An information acquisition device, comprising a CPU (Central Processing Unit) that is configured to:
    estimate, from a captured image data, a skeleton of a living body in the captured image data;
    acquire attribute data including a body height of the living body;
    calculate a first length equivalent to a first skeleton forming a part of the body height, the first length being obtained by subtracting a specified value from the body height;
    calculate a ratio of a length of a skeleton portion corresponding to a target portion of the living body to a length of the first skeleton, the length of the skeleton portion and the length of the first skeleton being lengths in the skeleton estimated from the captured image data; and
    calculate a length of the target portion of the living body by multiplying the first length by the ratio, of the target portion, calculated with respect to the length of the first skeleton in the skeleton estimated,
wherein
    the length of the first skeleton is between a predetermined position of a head and a predetermined position of a foot in the skeleton,
    the CPU obtains specified value determination data that is data being stored in advance and enabling determination of a specified value equivalent to a difference between a body height of a service user which is described in the attribute data and a skeleton of the service user,
    the specified value determination data includes a first specified value and a second specified value, the first specified value being equivalent to a length between the predetermined position of the head and a head top position, in the skeleton, the second specified value being equivalent to a length between a predetermined position of the foot and a sole position, in the skeleton,
    the specified value is a value obtained by adding the first specified value, and the second specified value,
    the target portion includes a leg,
    the CPU performs a foot grounding property determination process of determining foot grounding property when the living body is seated on a predetermined seating part based on a calculated length of the leg,
    in the foot grounding property determination process, the CPU acquires vehicle data related to a test ride vehicle on which a virtual test ride is possible, determines an amount of compression of a suspension of the test ride vehicle due to a body weight included in the attribute data using the vehicle data, corrects a seat height of the predetermined seating part by the amount of compression determined, and determines the foot grounding property based on the seat height corrected, and
    the CPU displays the foot grounding property determined on a display panel.

2. The information acquisition device according to claim 1, wherein
    the attribute data further includes at least any of age, sex and a body weight of the living body, and
    the specified value determination data is provided which is capable of determining the specified value according to the attribute data.

3. The information acquisition device according to claim 1, wherein
the CPU calculates a length of a skeleton of a leg of the living body based on ratios among skeletons including the first skeleton, and the first length, and calculates, as a length of an entire leg of the living body, a length obtained by adding, to the calculation result, a predetermined leg correction value.

4. The information acquisition device according to claim 1, wherein
the CPU calculates a length of a skeleton of an arm of the living body based on ratios among skeletons including the first skeleton, and the first length, and calculates, as a length of the arm, a value obtained by adding, to the calculation result, a predetermined arm correction value.

5. The information acquisition device according to claim 1, wherein
the skeleton estimation process is a process capable of estimating a skeleton excluding any information of shoes, a hat, clothes, and a hairstyle.

6. The information acquisition device according to claim 1, wherein
the skeleton estimation process is a process of estimating a skeleton of the living body using a predictive model in which an image of the living body serves as an input and the skeleton of the living body serves as an output.

7. The information acquisition device according to claim 1, wherein
the target portion includes a torso, and an arm, and
the CPU determines information about a posture of an upper body when the living body is seated on the predetermined seating part and grips a predetermined gripping part based on calculated lengths of the torso and the arm, and displays the determined information on a display panel.

8. An information acquisition method, comprising:
causing a CPU (Central Processing Unit) to:
estimate, from a capture image data, a skeleton of a living body in the captured image data;
acquire attribute data including a body height of the living body;
calculate a first length equivalent to a first skeleton forming a part of the body height, the first length being obtained by subtracting a specified value from the body height;
calculate a ratio of a length of a skeleton portion corresponding to a target portion of the living body to a length of the first skeleton, the length of the skeleton portion and the length of the first skeleton being lengths in the skeleton estimated from the captured image data; and
calculate a length of the target portion of the living body by multiplying the first length by the ratio, of the target portion, calculated with respect to the length of the first skeleton in the skeleton estimated, the length of the first skeleton being between a predetermined position of a head and a predetermined position of a foot in the skeleton;
obtain specified value determination data that is data being stored in advance and enabling determination of a specified value equivalent to a difference between a body height of a service user which is described in the attribute data and a skeleton of the service user, the specified value determination data including a first specified value and a second specified value, the first specified value being equivalent to a length between the predetermined position of the head and a head top position, in the skeleton, the second specified value being equivalent to a length between a predetermined position of the foot and a sole position, in the skeleton; and
obtain the specified value as a value obtained by adding the first specified value, and the second specified value,
wherein
the target portion includes a leg,
the information acquisition method causes the CPU to perform a foot grounding property determination process of determining foot grounding property when the living body is seated on a predetermined seating part based on a calculated length of the leg,
in the foot grounding property determination process, the CPU acquires vehicle data related to a test ride vehicle on which a virtual test ride is possible, determines an amount of compression of a suspension of the test ride vehicle due to a body weight included in the attribute data using the vehicle data, corrects a seat height of the predetermined seating part by the amount of compression determined, and determines the foot grounding property based on the seat height corrected, and
the information acquisition method causes the CPU to display the foot grounding property determined on a display panel.

9. A non-transitory computer-readable recording medium causing a computer to:
estimate, from a capture image data, a skeleton of a living body in the captured image data;
acquire attribute data including a body height of the living body;
calculate a first length equivalent to a first skeleton forming a part of the body height, the first length being obtained by subtracting a specified value from the body height;
calculate a ratio of a length of a skeleton portion corresponding to a target portion of the living body to a length of the first skeleton, the length of the skeleton portion and the length of the first skeleton being lengths in the skeleton estimated from the captured image data; and
calculate a length of the target portion of the living body by multiplying the first length by the ratio, of the target portion, calculated with respect to the length of the first skeleton in the skeleton estimated,
wherein
the length of the first skeleton is between a predetermined position of a head and a predetermined position of a foot in the skeleton,
the recording medium causes the computer to obtain specified value determination data that is data being stored in advance and enabling determination of a specified value equivalent to a difference between a body height of a service user which is described in the attribute data and a skeleton of the service user,
the specified value determination data includes a first specified value and a second specified value, the first specified value being equivalent to a length between the predetermined position of the head and a head top position, in the skeleton, the second specified value being equivalent to a length between a predetermined position of the foot and a sole position, in the skeleton,
the specified value is a value obtained by adding the first specified value, and the second specified value,
the target portion includes a leg, the recording medium causes the computer to function of performing a foot grounding property determination process of determining foot grounding property when the living body is seated on a predetermined seating part based on a calculated length of the leg, in the foot grounding property determination process, the computer acquires vehicle data related to a test ride vehicle on which a virtual test ride is possible, determines an amount of compression of a suspension of the test ride vehicle due to a body weight included in the attribute data using the vehicle data, corrects a seat height of the predetermined seating part by the amount of compression determined, and determines the foot grounding property based on the seat height corrected, and the recording medium causes the computer to function of displaying the foot grounding property determined on a display panel.

10. The information acquisition device according to claim 1, wherein the specified value determination data includes a plurality of first specified values and a plurality of second specified values, each of the plurality of first specified values being equivalent to a length between the predetermined position of the head and a head top position, in the skeleton, each of the plurality of second specified values being equivalent to a length between a predetermined position of the foot and a sole position, in the skeleton, the CPU determines one first specified value and one second specified value from the specified value determination data based on the attribute data, and the specified value is a value obtained by adding the one first specified value, and the one second specified value.

* * * * *